(12) United States Patent
Nada et al.

(10) Patent No.: US 6,381,318 B1
(45) Date of Patent: Apr. 30, 2002

(54) INTERNET TELEPHONE SYSTEM, ACCESS POINT APPARATUS, AND COMMUNICATION SYSTEM USING ACCESS POINT APPARATUS AND BROAD-RANGE DATA COMMUNICATION NETWORK

(75) Inventors: Noriaki Nada, Chikushino; Yasuyuki Nishioka, Dazaifu, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/079,398

(22) Filed: May 15, 1998

(30) Foreign Application Priority Data

May 21, 1997 (JP) .............................................. 9-130764

(51) Int. Cl.[7] .............................................. H04M 15/00
(52) U.S. Cl. ................................ 379/127.01; 379/93.02
(58) Field of Search .................................. 379/199, 142, 379/145, 93.24, 127, 114, 115, 112, 93.02, 93.03, 93.04, 121; 705/400, 30, 34–35; 709/225, 226, 227, 229

(56) References Cited

U.S. PATENT DOCUMENTS

| | | | | |
|---|---|---|---|---|
| 5,412,711 A | * | 5/1995 | Hayashi ....................... 379/196 |
| 5,559,874 A | * | 9/1996 | Panosh ........................ 379/189 |
| 5,724,412 A | * | 3/1998 | Srinivasan ................. 379/93.23 |
| 5,745,556 A | * | 4/1998 | Ronen .......................... 379/115 |
| 5,867,562 A | * | 2/1999 | Scherer ........................ 379/127 |
| 6,018,570 A | * | 1/2000 | Matison ........................ 379/196 |
| 6,122,255 A | * | 9/2000 | Bartholomew et al. ....... 370/237 |
| 6,145,002 A | * | 11/2000 | Srinivasan ................... 709/225 |
| 6,292,553 B1 | * | 9/2001 | Fellingham et al. ... 379/221.02 |

* cited by examiner

*Primary Examiner*—Curtis Kuntz
*Assistant Examiner*—Rexford Barnie
(74) *Attorney, Agent, or Firm*—Venable; Robert J. Frank; Allen Wood

(57) ABSTRACT

In an Internet telephone system, even though a user need not enter a user ID and a password, this internet telephone system can judge as to whether or not a telephone user is an authorized telephone user. To achieve this function, an Internet access point apparatus includes: a network interface unit functioning as an interface with a telephone line; a reception control unit for controlling the telephone line; a user data detecting unit for detecting user data and system data to thereby separate the user data from the system data; a calling telephone number detecting unit for detecting a calling telephone number sent via the telephone line to thereby recognize the telephone number of the telephone caller; an individual identifying unit for determining whether or not a telephone connection request is issued from an authorized telephone user on the basis of a detection result made by the calling telephone number detecting unit; and an output unit functioning as an interface with the Internet.

9 Claims, 3 Drawing Sheets

INTERNET TELEPHONE SYSTEM, ACCESS POINT APPARATUS, AND COMMUNICATION SYSTEM USING ACCESS POINT APPARATUS AND BROAD-RANGE DATA COMMUNICATION NETWORK

BACKGROUND OF THE INVENTION

1. Field of the Invention

The present invention is related to an Internet telephone system for connecting a telephone via an access point apparatus to the Internet, and an access point apparatus, and further to a communication system using a broad-range data communication network with the access point apparatus.

2. Description of the Related Art

Recently, Internet telephone systems utilizing the Internet have been developed. A conventional Internet telephone system will now be described.

In a general-purpose public telephone system, a telephone of a telephone caller is connected to a telephone of a called party or counter party by using a telephone switching unit owned (for example) by Nippon Telephone and Telegram company (NTT). In an Internet telephone system, an Internet telephone caller is connected from a telephone line of a public telephone network to an access point (namely, a connection point) of an Internet service provider or Internet connection party (provider), and then speech data is transmitted from this access point via the Internet to another access point where an Internet telephone counter party is present (namely, an access point of the Internet telephone counter party). Speech is sent from the access point of the Internet telephone counter party via the public telephone network to a telephone of this Internet telephone counter party. In other words, the function of the telephone switching unit is realized by the access point apparatus of the Internet connection party. Then, in the access point apparatus of this Internet connection party, a so-called "identification" process operation is required which identifies as to whether or not a telephone caller who accesses the access point apparatus is an authorized user.

FIG. 4 is a schematic block diagram for indicating an access point apparatus employed in a conventional Internet telephone system. FIG. 5 is a structural diagram for schematically indicating an Internet telephone system with employment of the conventional access point apparatus. In FIG. 4 and FIG. 5, reference numeral 1 shows a telephone line of a public telephone network 1', reference numeral 2 represents a network interface unit equal to an interface with the telephone line, reference numeral 3 indicates a reception control unit for controlling the telephone line 1, and reference numeral 4 denotes a user data detecting unit for separating user data from system data. The public telephone network includes switching units, one of which is designated by reference numeral 20. Also, reference numeral 6 is an individual identifying unit for identifying whether or not a telephone connection request is issued from an authorized user, reference numeral 7 shows an individual identification data detecting unit for detecting individual identification data, reference numeral 8 represents an output unit equal to an interface with the Internet 9, reference numeral 10A denotes an access point apparatus arranged by a connecting apparatus 12, and a user ID identifying unit 13, and also reference numeral 11 shows a telephone. It should be understood that the connecting apparatus 12 shown in FIG. 5 is constructed of the structural elements 2 to 4, 7, and 8, whereas the user ID identifying unit 13 is constituted by the individual identifying unit 6.

A description will now be made of operations as to the conventional Internet telephone system with employment of the above-described arrangement.

First, a telephone call issued from a user (telephone call issued from telephone 11) is connected via the public telephone network 1' to the access point apparatus 10A of the Internet connection party. After the access point connection, a connection sequence for a data communication is carried out in accordance with a communication protocol known as PPP (Point to Point Protocol). The individual identification is carried out in this data communication connection sequence. That is, both a character stream known as a "user ID", made of alphanumeric characters allocated to each of the users, and another character stream known as a "password", made of alphanumeric characters allocated to each of the users, are transmitted as user data from the user (telephone 11) to the connecting apparatus 12 of the access point apparatus 10A. The data received via the network interface unit 2 of the connecting apparatus 12 is inputted from the reception control unit 3 to the user data detecting unit 4 so as to be separated into the system data and the user data. Then, only the user data is sent to the individual identification data detecting unit 7. In the individual identification data detecting unit 7, the inputted user data is separated into the user ID, the password, and other data. Other data is sent to the output unit 8, whereas both the user ID and the password are sent to the individual identifying unit 6. In the individual identifying unit 6, the user IDs and the passwords of the users have been stored in a database. This individual identifying unit 6 judges as to whether or not the received user ID and password are equal to a registered user ID and password. If both the received user ID and password coincide with a registered user ID and password, it is judged that this user is an authorized user. If this user ID is not registered, or both the received user ID and password do not coincide with a registered user ID and password, then it is judged that this user is not an authorized user. Then, the advances operation is advanced to an error processing operation.

However, the above-described conventional Internet telephone system has the following problem. That is, when the Internet telephone system is utilized from a general home telephone, the user is required to manage or enter the user's ID and password, which are employed in order to judge as to whether or not a telephone counter party who accesses to the access point apparatus 10A is an authorized telephone user who has made a contract.

In this Internet telephone system, even when the user ID and the password are not managed by the user, such a requirement is made, by which a judgement is made as to whether or not the telephone user is an authorized user (namely, telephone user who has made contract).

SUMMARY OF THE INVENTION

The present invention has as an object to provide an Internet telephone system capable of judging as to whether or not a telephone user corresponds to an authorized telephone user even when the user does not manage a user ID and a password.

To achieve the above-described object, an Internet telephone system, according to an aspect of the present invention, is featured by that in an Internet telephone system for connecting a telephone via a telephone line of a telephone network and an access point apparatus to the Internet, the access point apparatus is comprised of: a network interface unit functioning as an interface with the telephone line; a reception control unit for controlling the telephone line;

a user data detecting unit for detecting user data and system data to thereby separate the user data from the system data; a calling telephone number detecting unit for detecting a calling telephone number sent via the telephone line to thereby recognize a telephone number of a telephone caller; an individual identifying unit for determining whether or not a telephone connection request is issued from an authorized telephone user on the basis of a detection result made by the calling telephone number detecting unit; and an output unit functioning as an interface with the Internet.

As a consequence, it is possible to accomplish such an Internet telephone system capable of judging as to whether or not the telephone user is equal to an authorized telephone user, even though the user need not manage the user ID and the password.

BRIEF DESCRIPTION OF THE DRAWINGS

A more complete understanding of the teachings of the present invention may be acquired by referring to the accompanying figures, in which.

DESCRIPTION OF THE PREFERRED EMBODIMENTS

Figure 1:
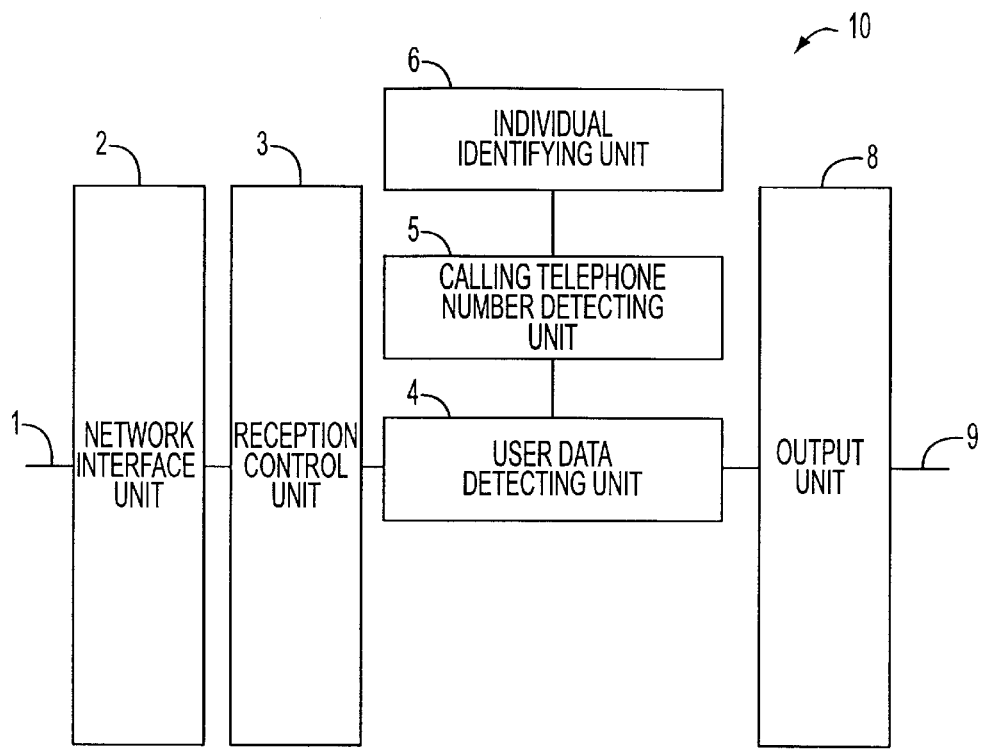
FIG. 1 is a schematic block diagram for representing an access point apparatus used to constitute an Internet telephone system according to an embodiment mode 1 of the present invention.
Figure 2:
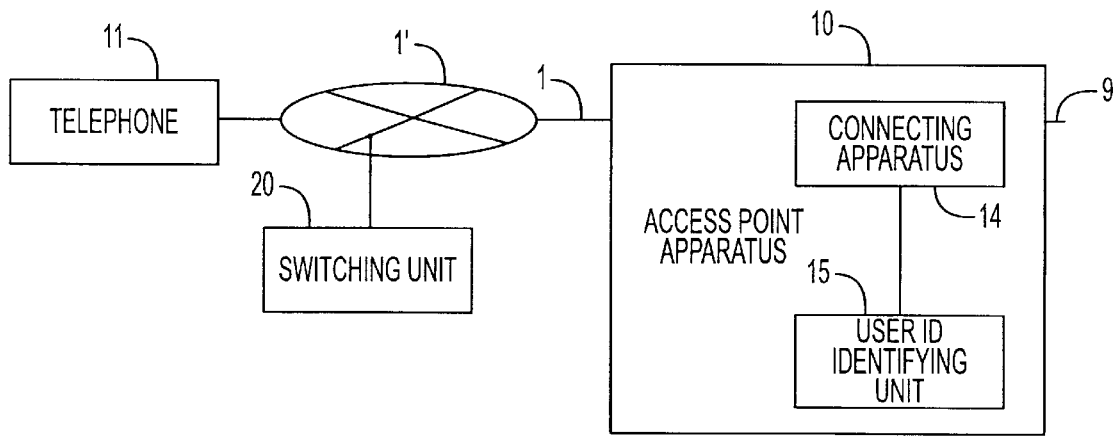
FIG. 2 schematically shows a structural diagram of the Internet telephone system according to the embodiment mode 1 of the present invention.

FIG. 1 is a schematic block diagram for showing an access point apparatus which constitutes an Internet telephone system according to an embodiment of the present invention. FIG. 2 is a structural diagram for representing the Internet telephone system according to this embodiment mode 1. In FIG. 1 and FIG. 2, reference numeral 1 shows a telephone line of a public telephone network 1' reference numeral 2 represents a network interface unit equal to an interface with the telephone line, reference numeral 3 indicates a reception control unit for controlling the telephone line 1, and reference numeral 4 denotes a user data detecting unit for separating user data from system data. Also, reference numeral 5 shows a calling telephone number detecting unit for detecting a calling telephone number to recognize and judge a telephone number of a telephone caller, reference numeral 6 is an individual identifying unit for identifying whether or not a telephone connection request is issued from an authorized user, reference numeral 8 represents an output unit equal to an interface with the Internet 9 corresponding to the broad range data communication network, reference numeral 10 denotes an access point apparatus arranged by a connecting apparatus 14, and a user ID identifying unit 15, and also reference numeral 11 shows a telephone. The public telephone network 1' includes switching units, one of which is designated by reference numeral 20.

FIG. 2 schematically indicates a detailed structure of the access point apparatus 10. As indicated in FIG. 2, the connecting apparatus 14 includes the network interface unit 2, the reception control unit 3, the user data detecting unit 4, and the output unit 8, whereas the user ID identifying unit 15 includes the calling telephone number detecting unit 5, and the individual identifying unit 6.

A description will now be made of a function, an operation, and the like of the Internet telephone system with employment of the above-described arrangement.

First, a reception terminal initiation signal is received via the network interface unit 2 by the reception control unit 3 as a connection request issued from a user via the telephone line 1. Upon receipt of this reception terminal initiation signal, the reception control unit 3 recognizes this initiation signal as a telephone-line connection request issued from the user. Then, the reception control unit 3 transmits a primary response signal to the switching unit 20 of the public telephone network 1' and this primary response signal indicates that the reception control unit 3 receives the reception terminal initiation signal under normal conditions. After the primary response signal has been sent, the reception control unit 3 receives a calling telephone number signal through the network interface unit 2 from the switching unit 20 of the public telephone network 1'. The calling telephone number signal sent out from the switching unit corresponds to the modem signal standardized by ITU-T recommendation V.23. The reception control unit 3 transmits a reception completion signal for indicating that the reception of the calling telephone number by the reception control unit 3 is completed. After this reception completion signal has been sent, the reception control unit 3 receives a calling signal for indicating that a telephone call is issued from the switching unit to the connecting apparatus 14. Then, the reception control unit 3 transmits a secondary response signal for indicating that the connecting apparatus 14 responds to this telephone call.

Subsequently, the sequential operation of this Internet telephone system is carried out in a similar sequential operation executed in the general telephone calling operation of the conventional Internet telephone system. It should be noted that when any signals other than the reception terminal initiation signal are received, the reception control unit 3 performs the conventional telephone calling operation without producing the primary response signal.

The calling telephone number signal received by the reception control unit 3 is sent to the calling telephone number detecting unit 5. The calling telephone number signal sent to the calling telephone number detecting unit 5 is sent to the individual identifying unit 6 while only the telephone number data is derived therefrom. The individual identifying unit 6 identifies the sent calling telephone number with respect to the telephone numbers of all of the users (authorized users having made contract) which have previously registered into the database. When there is a registered telephone number coincident with the calling telephone number, the individual identifying unit 6 transmits an individual identification OK signal to the reception control unit 3. After the individual identifying unit 6 judges that the present telephone caller is the authorized user, the reception control unit 3 transmits only the user data via the output unit 8 to the Internet 9 corresponding to the broad range data communication network. On the other hand, if the calling telephone number is not coincident with any of the telephone numbers registered in the database, then the process operation is advanced to an error process operation.

Also, when such a signal not for notifying a calling telephone number is received from the switching unit 20 of the public telephone network 1' or another signal from which a calling telephone number cannot be recognized is received from the switching unit 20 of the public telephone network 1' the process operation is similarly advanced to the error process operation. In the error processing operation, the reception control unit 3 sends out an error signal via the network interface unit 3 to the public telephone network 1' and then clears the connection sequence.

Figure 3:
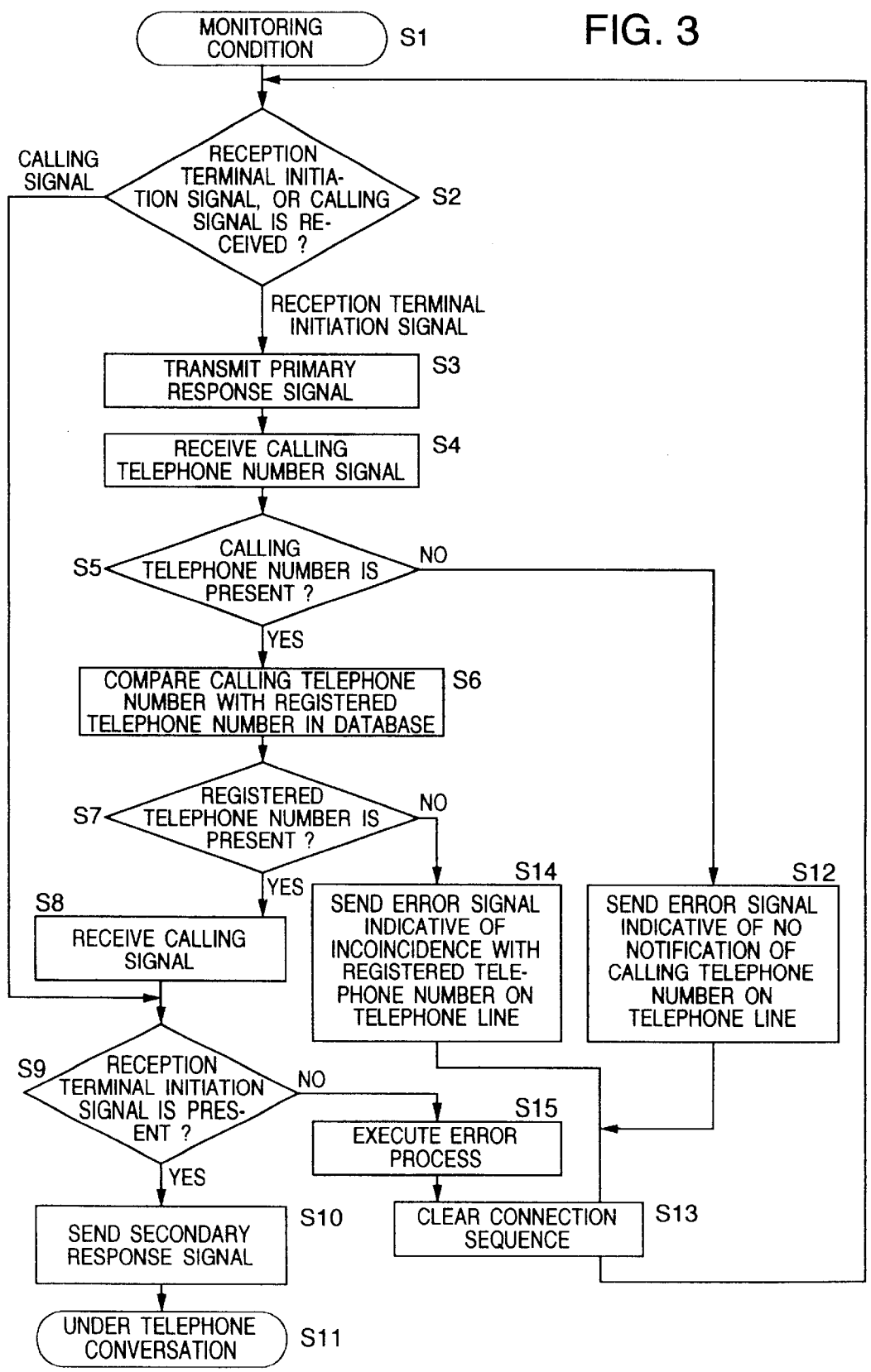
FIG. 3 is a flow chart for representing operations of the access point apparatus shown in FIG. 1.
Figure 4:
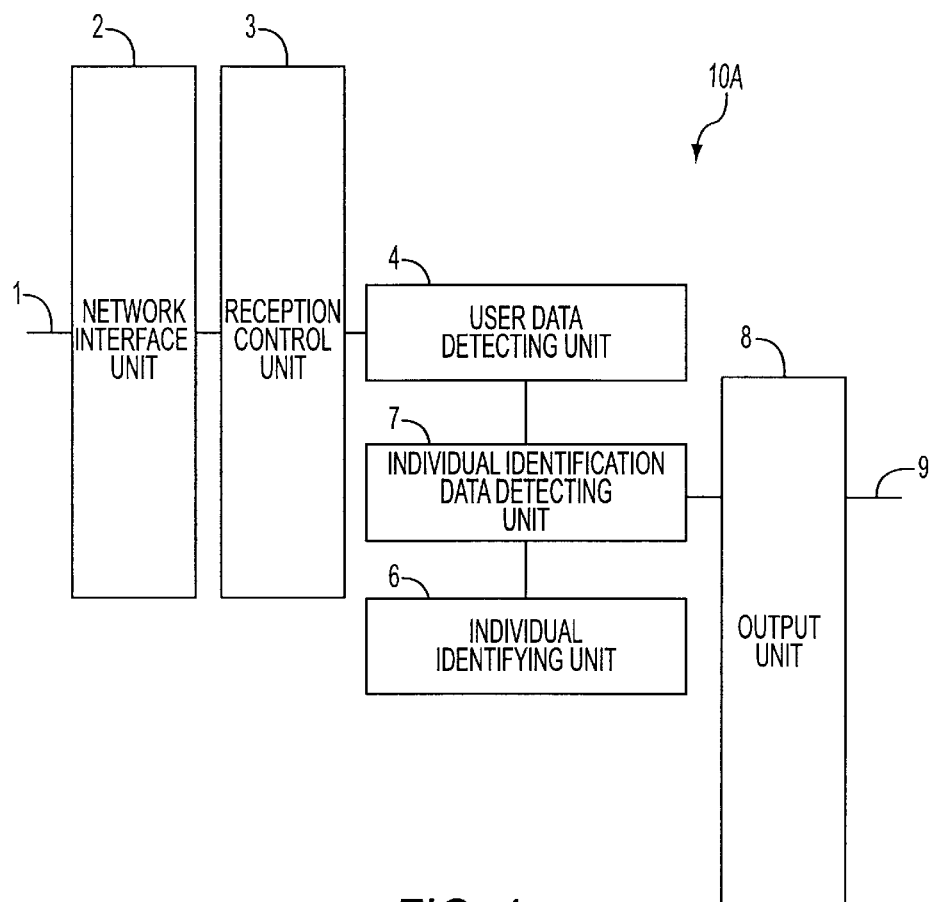
FIG. 4 is a schematic block diagram for indicating the access point apparatus employed in the conventional Internet telephone system.
Figure 5:
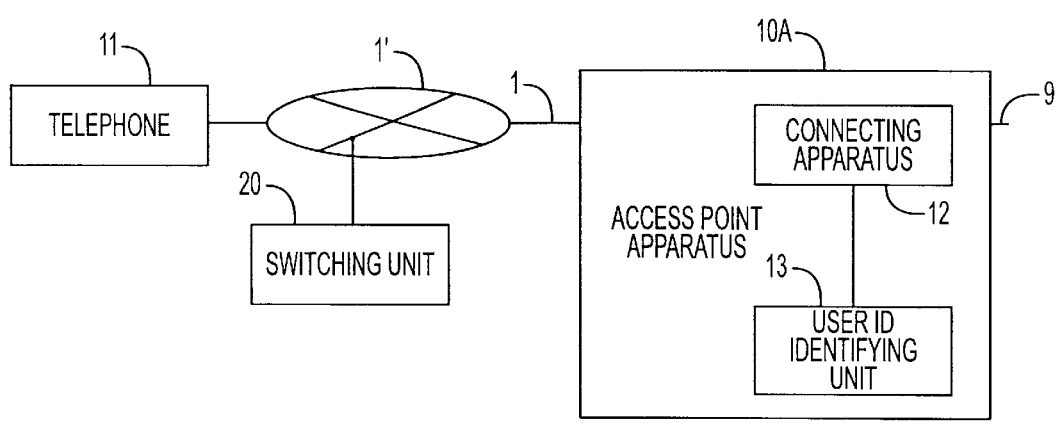
FIG. 5 is a structural diagram for representing the Internet telephone system with using the conventional access point apparatus.

FIG. 3 is a flow chart for indicating the operation of the access point apparatus 10 shown in FIG. 1.

Referring now to the flow chart of the operation of the access point apparatus 10 will be described.

When the initialization of the connecting apparatus 14 is accomplished, the control operation by the reception control unit 3 is advanced to the monitoring condition of the network interface unit 2 (step S1). Under this monitoring condition, the reception control unit 3 judges as to whether or not either the reception terminal initiation signal or the calling signal is received (step S2). When the reception control unit 3 judges that the reception terminal initiation signal is received, the primary response signal is transmitted via the network interface unit 20 2 to the switching unit of the public telephone network 1', within a predetermined time period (step S3). As a result, the reception control unit 3 receives a calling telephone number signal (namely, a modem signal) having a predetermined format within a predetermined time period from the switching unit 20 of the public telephone network 1' (step S4).

Next, the reception control unit 3 judges as to whether or not the calling telephone number is received under normal conditions (namely, whether or not a calling telephone number is received) (step S5). When the calling telephone number signal is received under normal conditions, the reception control unit 3 transmits a calling completion signal via the network interface unit 2 to the switching unit 20 of the public telephone network 1'. The calling telephone number signal received by the reception control unit 3 is sent to calling telephone number detecting unit 5, and the transmitted calling telephone number signal is outputted to the individual identifying unit 6 while only the telephone number data is derived from a predetermined format.

The individual identifying unit 6 compares the sent calling telephone number with the telephone numbers of all of the users (authorized users having made contact) which have been previously registered in the database (step S6), and judges as to whether or not there is such a registered telephone number coincident with this calling telephone number (step S7). When the individual identifying unit 6 judges that a registered telephone number coincident with the calling telephone number is present, after receiving the calling signal (step S8), the individual identifying unit 6 judges as to whether or not the reception terminal initiation signal is present (step S9). When the individual identifying unit 6 judges that the reception terminal initiation signal is present (in this case, since reception control unit 3 has judged that a reception terminal initiation signal has been received at step S2, individual identifying unit 6 judges that a reception terminal initiation signal is present), a secondary response signal is transmitted (step S10), and the telephone conversation is established (step S11). Then, only the user data is transmitted by the reception control unit 3 via the output unit 8 to the Internet 9.

Conversely, when the reception control unit 3 judges that there is no calling telephone number at the step 5, the reception control unit 3 sends out an error signal for indicating that the calling telephone number is not notified to the public telephone network 1' (step S12), and then clears the identification sequence (step S13).

When the individual identifying unit 6 judges that there is no registered telephone number coincident with the calling telephone number at the step S7, the individual identifying unit 6 transmits an error signal for indicating that a registered telephone number is not coincident with the calling telephone number to the public telephone line 1 (step S14), and then clears the connection sequence (step S13).

When the individual identifying unit 6 judges that the reception terminal initiation signal is not present at the step S9, since no individual identification can be carried out, the individual identifying unit 6 executes the error process operation so as to indicate an occurrence of an error (step S15), and clears the connection sequence (step S13).

When the reception control unit 3 judges that the calling signal is received at the step 2, the individual identifying unit 6 judges as to whether or not the reception terminal initiation signal is present (step S9). If the individual identifying unit 6 judges that there is no reception terminal initiation signal, then the individual identifying unit 6 performs the error process operation (step S15), and clears the connection sequence (S13). Conversely, if the individual identifying unit 6 judges that the reception terminal initiation signal is present, the individual identifying unit 6 transmits the secondary response signal (step S10), and the Internet telephone system is brought into the telephone conversation state (step S11).

It should also be noted that in the above-described embodiment mode, the medium used to connect the access point apparatus 10 of the Internet connection party with the terminal (telephone) 11 has been constituted by the public telephone network 1', connected by the normal code. Alternatively, this connection medium may be realized by employing other connection modes. Also, a portable telephone, and a personal handy-phone system (PHS) may be employed so as to realize such a terminal 11.

As previously described in detail, in accordance with the present embodiment mode, the individual identifying unit 6 executes the identification between the calling telephone number which has been decoded/detected by the calling telephone number detecting unit 5 and the telephone number of the registered user (namely, registered telephone number). When there is such a registered telephone number coincident with the detected calling telephone number, the operation of the Internet telephone system is advanced to the telephone conversation. As a consequence, even when the user does not manage the user ID and the password, the individual identifying unit 6 can judges as to whether or not the telephone user corresponds to an authorized user.

As explained above, in accordance with the Internet telephone system of the present invention, the access point apparatus includes: the network interface unit functioning as the interface with the telephone line; the reception control unit for controlling the telephone line; the user data detecting unit for detecting user data and system data to thereby separate the user data from the system data; the calling telephone number detecting unit for detecting the calling telephone number sent via the telephone line to thereby recognize the telephone number of the telephone caller; the individual identifying unit for judging as to whether or not the telephone connection request is issued from the authorized telephone user based upon the detection result made by the calling telephone number detecting unit; and the output unit functioning as an interface with the Internet. Thus, the access point apparatus can identify the detected calling telephone number with a registered telephone number, and can judge as to whether or not there is such a registered telephone number identical to the detected calling telephone number. Even though the user does not manage or enter the user ID and the password, the Internet telephone system can judge as to whether or not an authorized user issues the telephone call.

What is claimed is:

1. In an Internet telephone system for allowing a telephone caller to make a telephone call from a caller's telephone via a telephone network and the Internet, an access point apparatus which permits the telephone call if the caller's telephone has an authorized telephone number and which prevents the call if the telephone number of the caller's telephone is not authorized, said access point apparatus comprising:

a network interface unit functioning as an interface with the telephone network;

a calling telephone number detecting unit for detecting the telephone number of the caller's telephone, the telephone number of the caller's telephone being transmitted to the network interface unit by a switching unit of the telephone network when the telephone caller seeks to initiate the telephone call;

an individual identifying unit, having a database of authorized telephone numbers, for comparing the telephone number detected by the calling telephone number detecting unit with the authorized telephone numbers and determining whether or not the detected telephone number is one of the authorized telephone numbers; and an output unit functioning as an interface with the Internet, wherein the individual identifying unit permits the telephone call to be made via the telephone network and the Internet if the detected telephone number is an authorized telephone number, and otherwise prevents the telephone call, and wherein the access point apparatus further includes means for preventing the telephone call via the telephone network and the Internet if the telephone number of the caller's telephone is not detected by the calling telephone number detecting unit.

2. An access point apparatus connected between a telephone network and the Internet, for permitting a telephone call from a caller's telephone via the telephone network and the Internet if the caller's telephone has an authorized telephone number and for preventing the telephone call via the telephone network and the Internet if the telephone number of the caller's telephone is not authorized, comprising:

a network interface unit functioning as an interface with a telephone line of the telephone network;

a reception control unit for controlling the telephone line via the interface unit;

a user data detecting unit for detecting user data and system data of the telephone call;

a calling telephone number detecting unit for detecting the telephone number of the caller's telephone, sent from a switching unit of the telephone network following a connection request from the caller's telephone, to thereby detect the telephone number of the caller's telephone;

an individual identifying unit, having a database of authorized telephone numbers, for comparing the telephone number detected by the calling telephone number detecting unit with the authorized telephone numbers and determining whether or not the detected telephone number is one of the authorized telephone numbers; and an output unit functioning as an interface with the Internet, wherein the individual identifying unit permits the telephone call to be made via the telephone network and the Internet if the detected telephone number is an authorized telephone number, and otherwise prevents the telephone call, and wherein the access point apparatus further includes means for preventing the telephone call via the telephone network and the Internet if the telephone number of the caller's telephone is not detected by the calling telephone number detecting unit.

3. In a communication system for allowing a telephone caller to make a telephone call from a caller's telephone via a telephone network, an access apparatus, and a broad range data communication network, the access point apparatus permitting the telephone call if the caller's telephone has an authorized telephone number and preventing the telephone call if the telephone number of the caller's telephone is not authorized, said access point apparatus comprising:

a network interface unit functioning as an interface with the telephone network;

a calling telephone number detecting unit for detecting the telephone number of the caller's telephone, sent via the telephone network following a connection request from the caller's telephone, to thereby detect the telephone number of the caller's telephone;

an individual identifying unit, having a database of authorized telephone numbers, for comparing the telephone number detected by the calling telephone number detecting unit with the authorized telephone numbers and determining whether or not the detected telephone number is one of the authorized telephone numbers; and an output unit functioning as an interface with the Internet, wherein the individual identifying unit permits the telephone call to be made via the telephone network and the broad range data communication network if the detected telephone number is an authorized telephone number, and otherwise prevents the telephone call, and wherein the access point apparatus further includes means for preventing the telephone call via the telephone network and the broad range data communication network if the telephone number of the caller's telephone is not detected by the calling telephone number detecting unit.

4. An access point apparatus for allowing a telephone caller to make a telephone call from a caller's telephone over a communication system that includes a telephone network and the Internet, the access point apparatus permitting the telephone call if the caller's telephone has an authorized telephone number and preventing the telephone call if the telephone number of the caller's telephone is not authorized, said access point apparatus comprising:

a network interface unit functioning as an interface with the telephone network;

a calling telephone number detecting unit for detecting the telephone number of the caller's telephone, sent via the telephone network following a connection request from the caller's telephone, to thereby detect the telephone number of the caller's telephone;

an individual identifying unit, having a database of authorized telephone numbers, for comparing the telephone number detected by the calling telephone number detecting unit with the authorized telephone numbers and determining whether or not the detected telephone number is one of the authorized telephone numbers;

an output unit functioning as an interface with the Internet;

a control unit for permitting the telephone call to be made via the telephone network and the Internet if the detected telephone number is an authorized telephone number, and otherwise preventing the telephone call; and means for preventing the telephone call via the telephone network and the Internet if the telephone number of the caller's telephone is not detected by the calling telephone number detecting unit.

5. An access point apparatus as claimed in claim 1, wherein the telephone network is a public telephone network and the telephone number of the caller's telephone is sent automatically by the switching unit as part of a call-processing protocol.

6. An access point apparatus as claimed in claim 2, wherein the telephone network is a public telephone network and the telephone number of the caller's telephone is sent automatically by the switching unit as part of a call-processing protocol.

7. An access point apparatus as claimed in claim 3, wherein the telephone network is a public telephone network having a switching unit, and the telephone number of the caller's telephone is sent automatically by the switching unit as part of a call-processing protocol.

8. An access point apparatus as claimed in claim 4, wherein the telephone network is a public telephone network having a switching unit, and the telephone number of the caller's telephone is sent automatically by the switching unit as part of a call-processing protocol.

9. An access point apparatus as claimed in claim 2, wherein the access point apparatus permits or does not permit the telephone call via the telephone network and the Internet in accordance with whether the telephone number of the caller's telephone is authorized or not, without requiring the telephone caller to input a caller's ID and password.

* * * * *